(12) United States Patent
Potter et al.

(10) Patent No.: US 6,672,755 B1
(45) Date of Patent: Jan. 6, 2004

(54) EQUIPMENT FOR MIXING A POWDER WITH A LIQUID

(75) Inventors: Clive Potter, Cornwall (GB); Brian Piper, Cornwall (GB)

(73) Assignee: Klean Earth Environmental Company Inc., Lynwood, WA (US)

( * ) Notice: Subject to any disclaimer, the term of this patent is extended or adjusted under 35 U.S.C. 154(b) by 0 days.

(21) Appl. No.: 09/485,974

(22) PCT Filed: Jul. 15, 1998

(86) PCT No.: PCT/GB98/02086
§ 371 (c)(1),
(2), (4) Date: Aug. 17, 2000

(87) PCT Pub. No.: WO99/03570
PCT Pub. Date: Jan. 28, 1999

(30) Foreign Application Priority Data

Jul. 19, 1997 (GB) .............................. 9715179
Sep. 27, 1997 (GB) .............................. 9720514

(51) Int. Cl.[7] .................................. B01F 15/02
(52) U.S. Cl. .................. 366/175.2; 366/174.1; 366/178.1; 366/181.2; 366/181.3
(58) Field of Search ................ 366/137.1, 167.1, 366/177.1, 178.1, 181.1, 181.2, 181.3, 174.1, 175.2

(56) References Cited

U.S. PATENT DOCUMENTS

| | | |
|---|---|---|
| 1,560,826 A * | 11/1925 | Kirschbraun |
| 3,212,757 A | 10/1965 | Martin et al. |
| 3,782,695 A | 1/1974 | Sandiford |
| 3,893,658 A | 7/1975 | Sandiford |
| 3,986,706 A * | 10/1976 | Giombini ............. 259/24 |
| 4,099,005 A * | 7/1978 | Fullington et al. |
| 4,426,156 A * | 1/1984 | Adamo et al. |
| 5,344,619 A * | 9/1994 | Larwick et al. |
| 6,177,052 B1 * | 1/2001 | Weichs et al. |

FOREIGN PATENT DOCUMENTS

EP    0744250    11/1996

OTHER PUBLICATIONS

Aldrich catalog, p. 458, 1998.*
Dictionary of Organic Compounds, fifth edition, vol. 2, p. 1332, Oct. 1982.*

* cited by examiner

*Primary Examiner*—Charles E. Cooley
*Assistant Examiner*—David Sorkin
(74) *Attorney, Agent, or Firm*—Darby & Darby

(57) ABSTRACT

There is described a method of mixing a powder with a liquid comprising forming the liquid into a flowing film and dispersing the powder and directing it at the flowing liquid film so that it impinges thereon and mixes therewith. There is also described equipment (10) for mixing a powder with a liquid, comprising a mixing chamber (28), liquid inlet means (48) in the upper part of the chamber for directing the liquid on to an upper part of a supporting surface (31) in the chamber, the liquid inlet means (48) and the supporting surface (31) being so arranged that the liquid flows downwardly in adherence with the surface in use, and means for introducing the powder (13, 25) to the chamber (28) at a position spaced from the liquid inlet flow, for dispersing the powder within the chamber (28) and for directing it toward the said surface (31) so that it impinges on the liquid flowing down it, in use, and mixes therewith.

14 Claims, 6 Drawing Sheets

EQUIPMENT FOR MIXING A POWDER WITH A LIQUID

The present invention relates to the mixing of a powder with a liquid, particularly for enabling a solid reagent to mix and react with a liquid reagent.

Various methods of mixing solids and liquids are known. Many involve the agitation of the components in a rotary mixer combined with their stirring by driven blades or other mixing equipment. Such equipment can be very expensive to operate and can require the components to remain in the equipment for a considerable length of time to ensure that mixing is thorough and any solid lumps that may be formed are broken down.

An object of the present invention is to provide a method for mixing a powdered solid with a liquid that is both efficient and can be put into practice relatively cheaply so that it is suitable for use even with relatively large quantities of the components.

Accordingly the invention provides a method of mixing a powder and a liquid comprising forming the liquid into a flowing film and dispersing the powder and directing it at the flowing liquid film so that it impinges thereon and mixes therewith. The film is preferably formed in adherence with a wall surface, the liquid preferably being supplied to an upper part of the surface so that it flows downwardly along the surface under gravity and the powder is dispersed and directed at the wall to mix with the liquid.

The invention further provides, in another aspect, equipment for mixing a powder with a liquid, comprising a mixing chamber, liquid inlet means in the upper part of the chamber for directing the liquid on to an upper part of a supporting surface in the chamber, the liquid inlet means and the supporting surface being so arranged that the liquid flows downwardly in adherence with the surface in use, and means for introducing the powder to the chamber at a position spaced from the liquid inlet flow, for dispersing the powder within the chamber and for directing it toward the said surface so that it impinges on the liquid flowing down it, in use, and mixes therewith.

The advantage of the mixing method of the invention is that the liquid, being formed into a film presents a large surface area to the powder while the latter, being dispersed before it hits the liquid, will be captured thereby with less tendency to form aggregates than when a powder and liquid are simply fed into a container and mixed. A uniform mixture can thus be obtained fairly readily without great expenditures of energy.

In preferred embodiments of the invention the film is formed in such a way that its surface area expands as it moves away from the point at which the film is formed; this may be achieved by suitable shaping, for example curving, of a surface on which it is formed. Moreover conditions are preferably such that the film is turbulent, which, together with its large surface area, enhances the capture of the particles and mixing thereof within the liquid flow.

Although it is conceivable that the mixing might be carried out in an open environment, it is preferably carried out in a closed chamber and, again, although the film might be formed at one side of the chamber with the powder being directed at that side, it is preferred to employ a circular-section chamber with the film formed so as to flow down substantially the entire peripheral wall with the powder being dispersed from the central region and directed at the entire circumference.

Rotary feed inlets could be arranged to supply both the liquid and solid into the chamber, the inlets rotating to cover the entire circumference and the powder possibly being blown into the chamber to disperse it. Much more preferably, however, the powder is fed through a central, axial inlet and is centrifuged to direct it at the circumferential wall while the liquid is supplied through an annular inlet or array of spaced inlets coaxially around the powder inlet. Centrifuge means provided in the chamber may disperse the powder as well as directing it at the wall but suitable gas jets may also assist the dispersal and/or direction of the powder.

Although the invention as defined above is applicable to the mixing of any powder and liquid, it has been developed with particular concern to the mixing of an hygroscopic powder with an aqueous liquid and, even more particularly, to the mixing of powder and liquid reagents which react together. In these circumstances it is important to keep the solid and liquid components separate until they are brought together in the flowing liquid film and, in particular, to keep the powder supply dry up to this point.

More particularly it is found, in practice, with the use of hygroscopic solids, that it is both difficult and important to keep surfaces adjacent the powder inlet to the mixing chamber dry as any moisture in this region can cause the powder to cake, the caking gradually building up with time. Eventually this provides a path for mixture to track back into the powder supply duct, causing caking within the duct which obstructs the supply itself and necessitates stoppage of the process for cleaning. At worst, in the case of hygroscopic materials which react exothermically with water, this can result in substantial and even dangerous overheating, particularly if the moisture reaches a supply container.

Accordingly, a further aspect of the invention comprises a method for mixing an hygroscopic powder with an aqueous liquid comprising supplying the liquid to a chamber so that it flows in adherence with a surface therein, supplying the powder to powder delivery and dispersal means which disperse the powder in the chamber and direct it at the said surface so that it impinges on the flowing liquid and mixes therewith while preventing liquid/solid contact on or adjacent the powder delivery means that could result in moisture tracking back to the powder supply, the supporting surface preferably comprising a wall of the chamber itself.

The chamber might be arranged with appropriate baffles to prevent liquid/powder contact near the powder inlet but it has been found preferable to provide a dynamic seal between the powder inlet and parts of the chamber that might be contaminated by the liquid, the seal being formed, for example, by a gaseous flow. In particular, in the preferred circular-section chamber described above, an annular gas inlet is provided coaxially around the powder inlet through which gas is supplied to sweep moisture away from this region. The gas may be air depending on the nature of the components to be mixed. This arrangement has the added advantage that the gas flow assists in the dispersal of the powder within the chamber.

In addition to the provision of the dynamic seal to prevent liquid/powder contact at the powder inlet, the above mixing method provides for the formation of the liquid into a film that adheres to a surface in the chamber, preferably the chamber wall. Indeed steps are preferably taken to ensure that the liquid does flow on the wall surface without any splashing within the container which could result in splashing back to the powder inlet. For this purpose the delivery of the liquid to the wall surface is controlled both in quantity and direction so as to avoid splashing. To this end, the liquid may be delivered to the surface in a direction substantially along the surface and concordant with the desired direction of flow.

In a particularly preferred embodiment, the chamber has a domed upper wall and the liquid is fed substantially tangentially onto it from an upper inlet. The domed shape, conveniently although not necessarily spherical, ensures the desired spreading of the film out from the inlet to increase the surface area available to the solid particles. The chamber wall may continue in a smooth curve from its maximum circumference to an axial outlet but a frusto-conical shape is preferred in the lower part of the chamber to speed the fluid flow and to enhance turbulence which improves the mixing of the solid and liquid components.

The conical taper also enhances vortical flow within the chamber which may be further promoted by the provision of swirler means within the lower part of the chamber or in an outlet duct therefrom. Such vortical flow not only creates turbulence in the liquid but also causes a depression in the chamber which enhances any gas inlet flow around the powder inlet and the dispersion and centrifuging of the powder. In particular, although this gas flow may be driven by auxiliary drive means with or without imparting rotation directly, it can be arranged for the gas to be drawn in solely by the depression caused by the vortical flow. Likewise, any swirler means provided may be driven to rotate but, in practice, it is found that a static radial diffuser device achieves excellent mixing.

With reference now again to the liquid inlet flow, it was indicated above that this should preferably be controlled both in direction and quantity to prevent splashing. The quantitative flow may be, to some extent, controlled by appropriate valving in a supply duct but it is found that splashing may occur particularly when the liquid supply to the mixing chamber is either started or stopped. The liquid flow is therefore preferably controlled immediately at the inlet to the chamber.

For this purpose, regulable valve means may be provided at the inlet to adjust the size of the inlet aperture and/or the direction of the liquid flow through this aperture. The valve means may be regulable from the exterior of the equipment by manual, electronic or other suitable controls but most preferably are operated automatically in response to a sensed flow of the liquid. Such sensing and control may, for example, be achieved electronically via appropriate sensors in the flow path but, for simplicity, the valve means are actuated by the liquid flow itself, the valve means being biased towards a condition in which a smaller liquid flow is directed, without splashing, onto an adjacent wall surface over which it is to flow, and being movable by the flow itself as this in creases, against the biasing force, to a position in which the larger flow is also directed onto the wall surface without splashing.

The valve means preferably include a valve member movable between a position in which the inlet aperture is of a minimum size to allow the smaller liquid flow and a position of maximum size to allow the larger flow. The inlet means are preferably arranged, as indicated above, to direct the inlet flow substantially along the adjacent wall surface rather than at a large angle to it, which would promote splashing, in all positions of the valve member.

In the preferred case of an annular inlet to a circular section chamber, the valve member is preferably also annular and mounted on a fixed part of the chamber surrounding the powder inlet. The valve member may be movable, or expandable, radially of the chamber to reduce the inlet size but, in a preferred embodiment, is slidable axially of the chamber between its positions of use under the action of resilient biasing means.

In preferred embodiments of the invention, the powder supplied to the mixing chamber is dispersed and directed at the peripheral wall at least partly by centrifuge means. Conveniently the powder is dropped from an upper inlet to the chamber onto the centrifuge means within the chamber preferably closely below the powder inlet and including blades, vanes or other members extending from a rotary shaft which can break up any lumps of powder as well as centrifuging it towards the peripheral wall. The rotary shaft preferably extends axially from the chamber to receive drive from a suitable motor. Most conveniently it extends upwardly from the chamber through the powder inlet.

The powder may in some circumstances be fed solely under gravity to the mixing chamber from a supply chamber above it but in most cases a metered supply is required in which case an auger or equivalent means may be provided between the supply chamber and the mixing chamber.

Metered supplies both of the solid and the liquid are particularly required when the invention is employed for mixing solid and liquid reagents so that they can react but, more generally, the invention further provides a method of reacting a solid reagent with a liquid reagent, including providing the solid in powdered form and mixing the powder with the liquid under reaction conditions by forming the liquid into a film that flows in adherence with a supporting surface and dispersing the powder and directing it at the flowing liquid film so that it impinges thereon and mixes therewith.

The equipment described above is particularly useful for carrying out this method as it enables the solid, in very finely divided form, to be brought into contact with the liquid film so that intimate contact between the two media is achieved very quickly and over a very large surface area which promotes very rapid reactions. Moreover, by virtue of the turbulent conditions that can be achieved in the liquid film, the liquid surface is continuously renewed so as further to promote capture of solid particles while reactions can continue within the body of the liquid as the solid particles are retained therein. Depending always on the nature of the reagents themselves, the flow rates of the two reagents can be adjusted to ensure that the reaction at least nears completion within the mixing chamber and within a very short stay time.

The equipment described above also lends itself readily to the carrying out of a reaction involving oxidation of one of the components by oxygen. Accordingly, the invention further provides a method of reacting a solid reagent with a liquid reagent and simultaneously oxidising a component that can be oxidised by oxygen, including providing the solid in powdered form, forming the liquid into a flowing film and dispersing the powder with the aid of a gas flow containing oxygen while simultaneously directing the powder at the flowing liquid film so that the powder impinges on and mixes with the liquid, the reagents being held under such conditions that the oxidisable component is oxidised by the oxygen in the gas flow and the solid and liquid reagents react in the flowing liquid film.

As indicated above, the liquid inlet of the chamber of the invention may conveniently be separated from the powder inlet by a dynamic air seal and this air may, in addition to helping to disperse the powder and preventing moisture from tracking back to the powder source, also supply the oxygen required for the oxidation reaction.

The equipment described above may include appropriate storage, delivery and metering means for delivering the two components to the mixing chamber in desired relative proportions. Also it may include a receiving vessel for the mixture, from the chamber where, if necessary, the reaction may be completed before the finished product is stored or discharged. Appropriate monitoring equipment for monitoring the finished product and/or the starting components may also be provided together with appropriate feed-back controls for changing conditions as necessary.

The method and equipment described above has been devised particularly with a view to treating acid mine discharges which often contain a variety of toxic metals, to enable liquid, specifically water, and solid products to be obtained which can be discharged safely into the environment or disposed of safely in appropriate dumps. To this end it is found possible to treat the acid discharge with a mixture of oxides to neutralise it or raise its pH to a slightly alkaline value in a continuous flow in the equipment described above, the reaction possibly being completed in ducts downstream of the mixing chamber, and to obtain a sedimentable suspension in which the metals are bound in non-toxic form. The invention further comprehends a method of treating mine discharges to render them safe and disposable as indicated above.

In a variant of the invention, the mixing method further comprehends a step of mixing additional liquid with the liquid/solid mixture formed in the flowing film or, considered alternatively, a two step mixing process comprising a first step in which a powder is mixed with a first quantity of liquid by forming the liquid into flowing film and dispersing the powder and directing it at the flowing liquid film so that it impinges thereon and mixes therewith and a second step in which a further quantity of liquid is mixed with the mixture resulting from the first step.

This variant method of the invention has the advantage that the relatively difficult process of mixing a solid quickly and thoroughly with a liquid is achieved by the first step of the method of the invention which can be carried out in the equipment described above, with appropriate devices being provided and measures being taken to ensure proper mixing even of hygroscopic solids; even large volumes of liquid can then be added easily without the need for expensive mixing equipment. In particular, although the initial solid/liquid mixture and additional liquid may be fed into a common vessel provided with power-driven agitators, such a solution would require an additional power input and it is found possible to achieve the required mixing by forcing the two flows to pass through a common duct provided with static mixer means which cause turbulent flow and hence mixing.

Various mixer blades or baffles may be envisaged but, in combination with the preferred equipment described above, a radial diffuser device similar to that used to enhance vortical flow in the primary liquid/solid mixture, may be used.

The liquid/solid and liquid flows may simply feed into a common duct provided with the mixer means but it is found that enhanced performance is achieved if the liquid/solid mixture is supplied to outlet means within a duct carrying the larger liquid flow, the flows being in the same direction, and the duct having a Venturi restriction substantially around the outlet means such that, in use, the depression caused by the flow through the Venturi constriction draws the liquid/solid mixture into the liquid flow. The outlet means may comprise an axial is outlet from a duct carrying the liquid/solid mixture and/or peripheral apertures in an end portion of the duct. In addition to enhancing the mixing of the solid/liquid and liquid flows, the Venturi effect may provide the required depression in the mixing chamber to cause air to be drawn into it.

Two embodiments of the invention will now be more particularly described, by way of example, with reference to the accompanying drawings, in which.

Figure 1A:
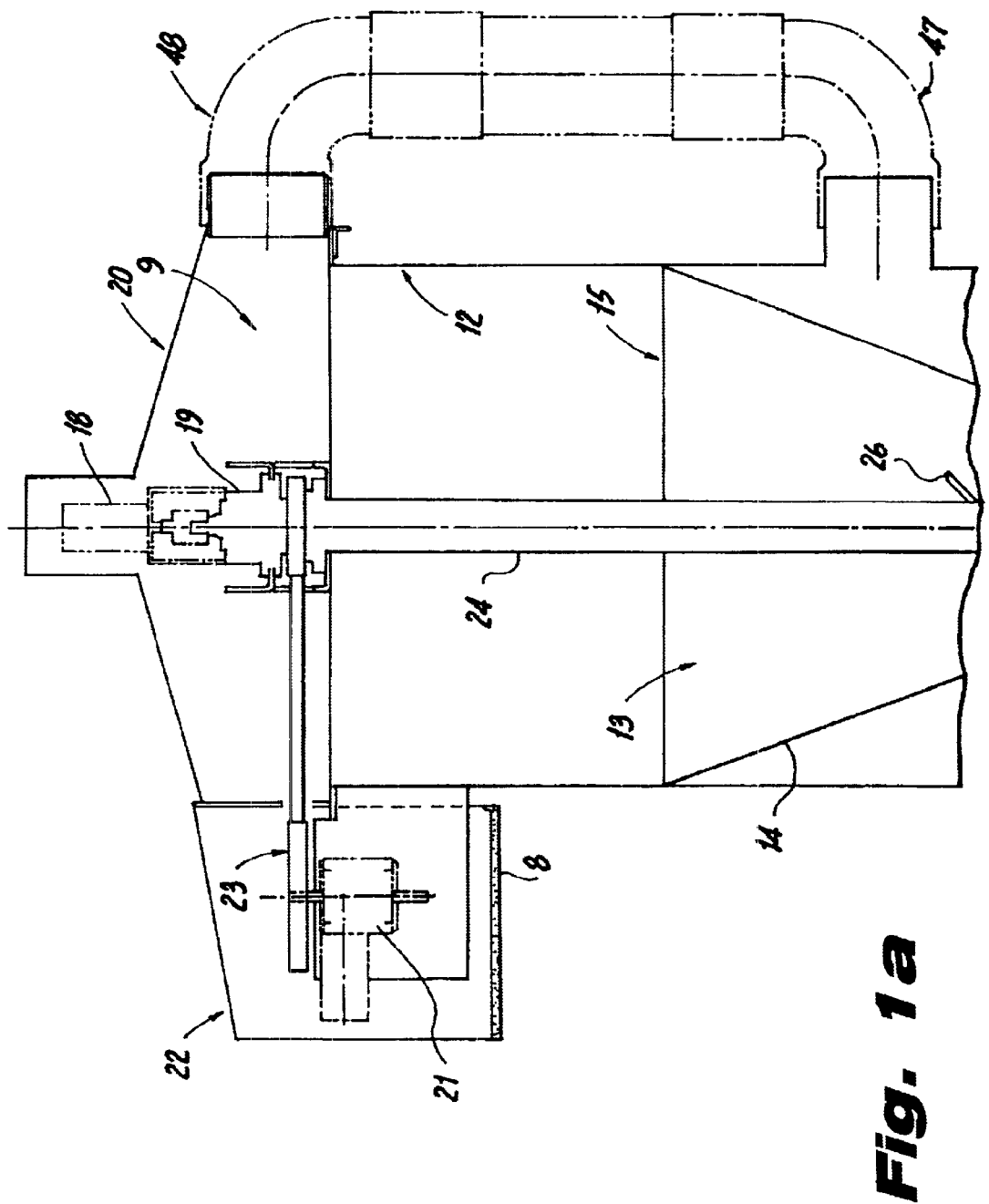
FIG. 1 is a schematic axial sectional view of equipment for mixing a powder and a liquid, shown in two parts 1*a* and 1*b*.
Figure 1B:
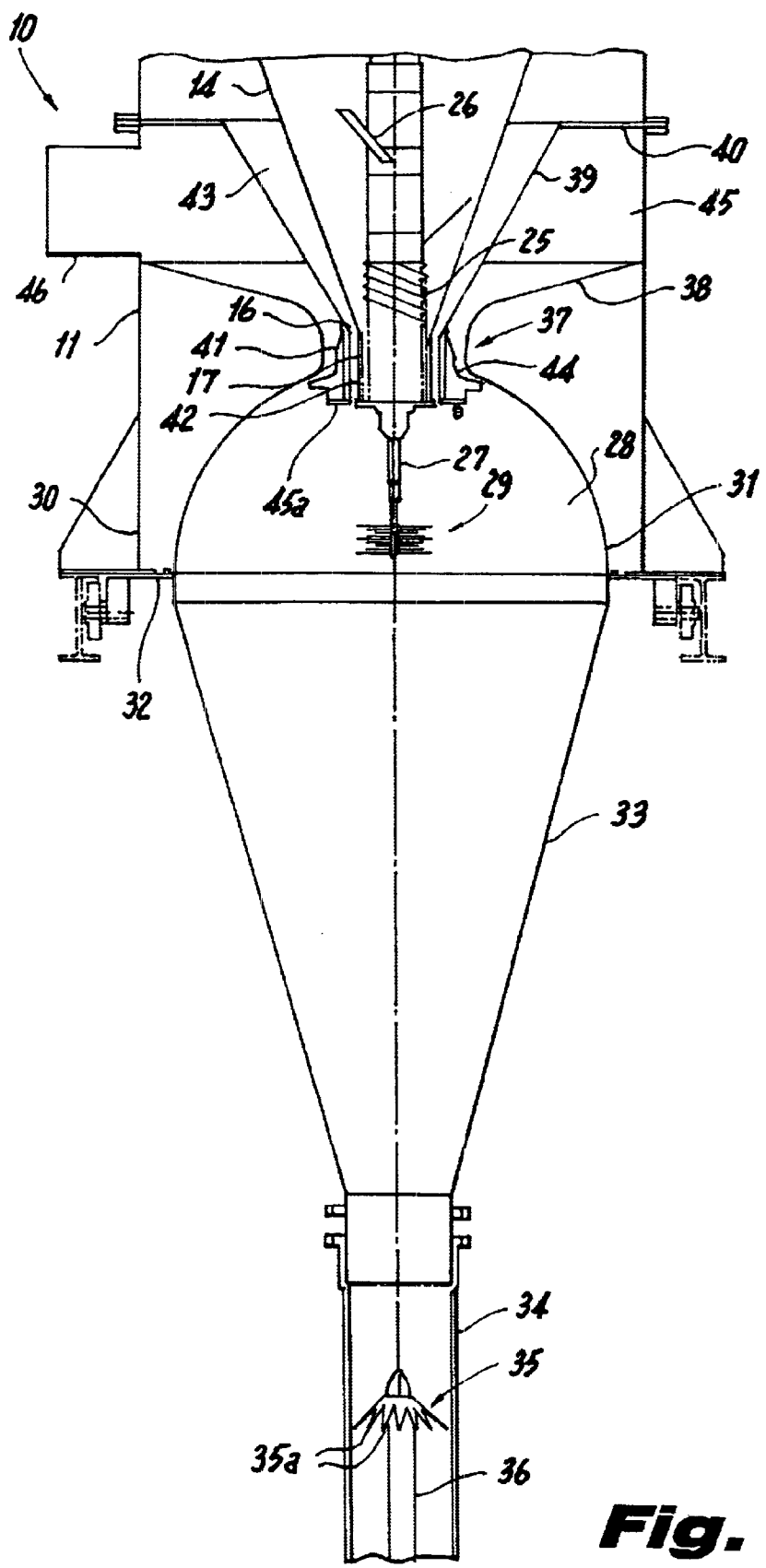

With reference to FIGS. 1 to 4 of the drawings, the equipment shown generally indicated 10 includes a main outer cylindrical casing 11 arranged with its axis vertical and closed at the top by a cover 9. An upper part 12 of the casing 11 defines the upper portion of a powder hopper 13; the lower portion of the hopper 13 is defined by a frusto-conical wall 14 sealed to the casing 11 around its upper, larger-diameter circumference 15 and tapering inwardly and downwardly therefrom to a bottom opening 16 sealed to a concave cylindrical housing 17.

The cover 9 supports a first motor 18 and a support and transmission unit generally indicated 19 housed in an auxiliary casing 20 above the main casing 11. A second motor 21 is housed in a further chamber 22 alongside the auxiliary casing 20 and the upper part of the casing 11 and is connected to the support/transmission unit 19 via a belt 23. The motor chamber 22 has an air inlet, indicated at 8, beneath the motor 21 for admitting air to the chamber 22 and thence to the auxiliary casing 20 to cool both the first and second motors 18, 21 and for further use in the equipment 10 as will be described below. The support/transmission unit 19 will be described below in relation to FIG. 4.

The support and transmission unit 19 supports a drive tube 24 which extends coaxially down through the hopper 13 and carries a n auger 25 at its lower end. This is located in the lowermost part of the hopper 13 defined by the bottom portion of the frusto-conical wall 14 and the cylindrical housing 17 which closely surrounds the auger 25 to define a feed duct 25*a* therewith. The auger-drive tube 24 also carries a plurality of mixer arms 26 spaced circumferentially around it at different levels above the auger 25 but within the lower part of the hopper 13 and projecting outwardly and upwardly from the tube 24 itself.

The support/transmission unit 19 further supports a drive shaft 27 which extends coaxially through the auger drive tube 24 and projects from the bottom end thereof into a mixer chamber 28 surrounding the outlet from the auger feed duct 25*a*. A lower end portion of the drive shaft 27 carries a plurality of flails 29 constituted by monofilament NYLON (Registered Trade Mark) lines secured in diametral through-holes arranged in a helical formation in the shaft 27 such that the two end portions of each line project by equal amounts in opposite directions from the shaft 27.

The upper part of the mixer chamber 28 surrounding the outlet from the auger feed duct 25*a* is bounded by a hemispherical wall 31 housed within the lowermost part 30 of the main casing 11 and arranged with its concavity facing downwardly. The lower circular edge of the hemispherical wall 31 is supported from the casing 11 by an annular flange 32 which also seals the gap between the wall 31 and the casing 11. The lower edge of the hemispherical wall 31 continues into, or is sealed to, a frusto-conical casing 33, coaxial with the casing 11, which tapers downwardly to a lower, coaxial outlet to a tail pipe 34. A radial diffuser 35 is mounted within the upper part of the tail pipe 34 being carried by a shaft 36. The diffuser 35 comprises a plurality of tapered fingers 35a spaced radially around a mount carried by the shaft 36 and projecting downwardly therefrom at an acute angle to the shaft axis. The tail pipe 34 is of sufficient length to impart a substantial velocity to liquid flowing down it under gravity, in use, and thereby cause a vortex in the liquid flow for reasons explained more fully below.

The uppermost portion of the hemispherical chamber wall 31 defines an aperture coaxially surrounding the auger housing 17 and is surmounted by an integrally-formed annular wall 37 which has a slight outward conical taper. This wall 37 is joined to a further frusto-conical wall 38, having a much larger conic angle, and the outer periphery of which is sealed to the main casing 11. The surfaces interconnecting the hemispherical wall 31, the annular wall 37 and the frusto-conical wall 38 are smoothly curved.

As indicated above, the main cylindrical casing 11 of the equipment 10 encloses two frusto-conical walls, the upper one 14, defining part of the hopper 13, and the lower one 38. Between these two walls 14, 38, the casing 11 also supports a frusto-conical partition 39 having an intermediate conic angle and tapering in the same direction. This intermediate frusto-conical partition 39 is connected to the outer casing 11 via a radial flange 40 at its larger end while its smaller end supports a dependent cylindrical duct 41 which extends coaxially between the auger housing 17 and the annular wall 37 interconnecting the hemispherical chamber wall 31 and the frusto-conical wall 38. The duct 41 defines an inner, annular passage 42 between its inner surface and the housing 17, this passage opening at its lower end into the mixer chamber 28 and at its upper end into a compartment 43 within the casing 11 but outside the hopper wall 14. The duct 41 also defines an outer annular passage 44 between its outer face and the annular wall 37, this passage 44 communicating at its upper end with an annular chamber 45 formed within the casing 11 between the frusto-conical wall 38 and the partition 39 and at its lower end, with the mixer chamber 28. The passage 44 is shaped by the addition of a flow-deflector and valve unit, generally indicated 45a, to the lower end of the duct 41 which will be described more fully below in relation to FIG. 2.

The annular chamber 45 constitutes a liquid-inlet chamber for liquid to be supplied to the mixer chamber 28 and, in use, receives liquid through a liquid-inlet pipe 46 sealed to an aperture in the main casing 11. The compartment 43, which communicates with the inner annular passage 42 around the auger housing 17, on the other hand, constitutes an air-inlet chamber and, in use, receives air through an air-inlet duct 47 sealed at its lower end to an aperture in the main casing 11 and at its upper end to an aperture in the auxiliary casing 20 so as to receive the cooling air for the motors 18, 21 ducted in through the inlet 8.

Figure 2:
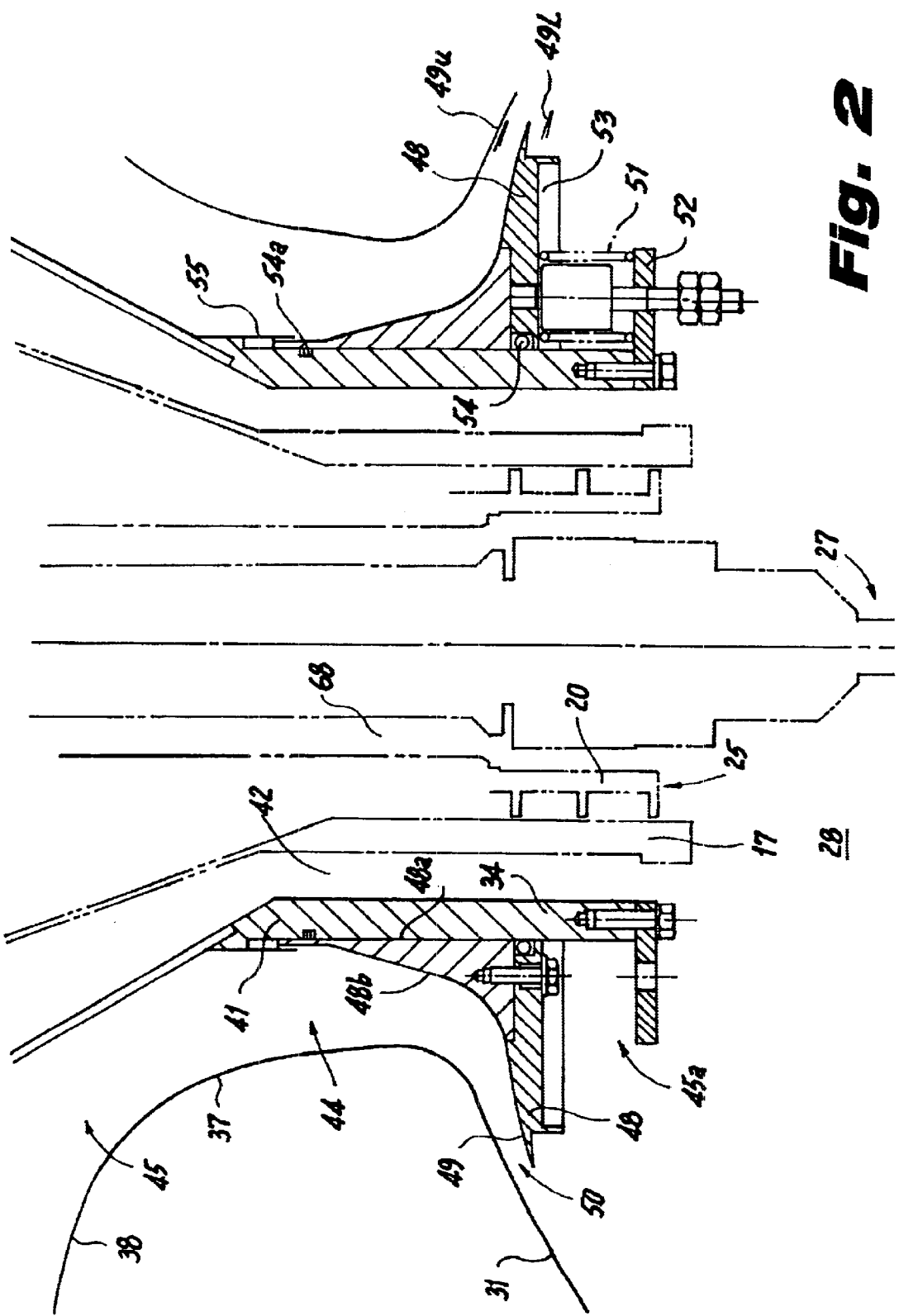
FIG. 2 is an enlarged sectional view of a detail of FIG. 1.

With reference now to FIG. 2 of the drawings, this shows in greater detail the flow-deflector and valve unit 45a at the inlet to the mixer chamber 28. The unit 45a is constituted by a two-part annular flow-deflector member 48 having a cylindrical inner face 48a, which co-operates with the outside of the duct 41, and a shaped outer face 48b facing the opposing surfaces of the annular wall 37 bounding the liquid-inlet passage 44 and the adjoining face of the hemispherical wall 31. More particularly, the flow-deflector outer face 48b has an upper frusto-conical portion with a relatively small conic angle facing the annular wall 37 and a second frusto-conical portion with a large conic angle facing the hemispherical wall 31, these two portions being interconnected by a smoothly-curved surface. In addition, an annular knife-edge portion 49 projects beyond the outer edge of the main body of the deflector member 48, its surface continuing smoothly, but at a slightly different angle to the adjoining portion of the surface 48b. The deflector member 48 is thus shaped to define a portion of the passage 44 which tapers from its inlet end, nearer the inlet chamber 45, towards its outlet, indicated 50, adjacent the hemispherical chamber wall 31. Moreover it also changes the direction of this passage 44 from generally axial and vertical adjacent the inlet chamber 45, to almost horizontal at the outlet 50 such that a liquid flow therethrough, in use, is directed along the hemispherical wall 31.

The flow-deflector member 48 is slidable on the outside of the duct 41 and is urged upwardly therealong by one or more (only one shown in the drawings) helical compression springs 51 located between a fixed flange 52 attached to the lower end of the duct 41 so as to project radially outwardly therefrom and a bottom surface 53 of the flow-deflector member 48 itself. The flow-deflector member 48 is movable between upper and lower travel-limit positions in which the outlet gap 50 between the knife edge 49 and the opposing wall 31 are a minimum and a maximum respectively: the deflector member is shown in full outline in a position intermediate the upper and lower positions while the upper and lower travel limit positions of the knife edge 49 are indicated at 49U and 49L respectively. Position 49U essentially ensures a clearance is maintained between value 48 and chamber wall 31 in the nominally "closed" position of the valve. This clearance (approximately 1 mm) is maintained by the accurate positioning of the lock nuts on the studs which run through the compression springs 51 limiting the upward travel of the valve.

In use, the deflector member 48 assumes its upper position 49U at rest, under the action of the spring 51, but can be forced downwardly, against this action, when liquid is introduced into the inlet chamber 45 and flows down through the passage 44 into the mixing chamber 28. The flow-deflector member 48 thus acts both to deflect the liquid flow along the wall 31 and as a variable-orifice valve member.

For convenience of manufacture, the deflector member 48 is formed in two parts and an O-ring seal 54 is trapped in a chamber between them, against the duct 41, to prevent any seepage of liquid along this duct. The upper end of the deflector member 48 is protected by an annular cover plate 55 secured to the duct 41 above it and a further O-ring seal 54a is located in a recess in the outer face of the duct 41 in sliding contact with the deflector member 48 further to reduce seepage between the member 48 and the duct 41 and to prevent the ingress of abrasive sediment held in suspension in the liquid flow which might prevent the free movement of the shielding valve under the influence of its springs 51.

Figure 3:
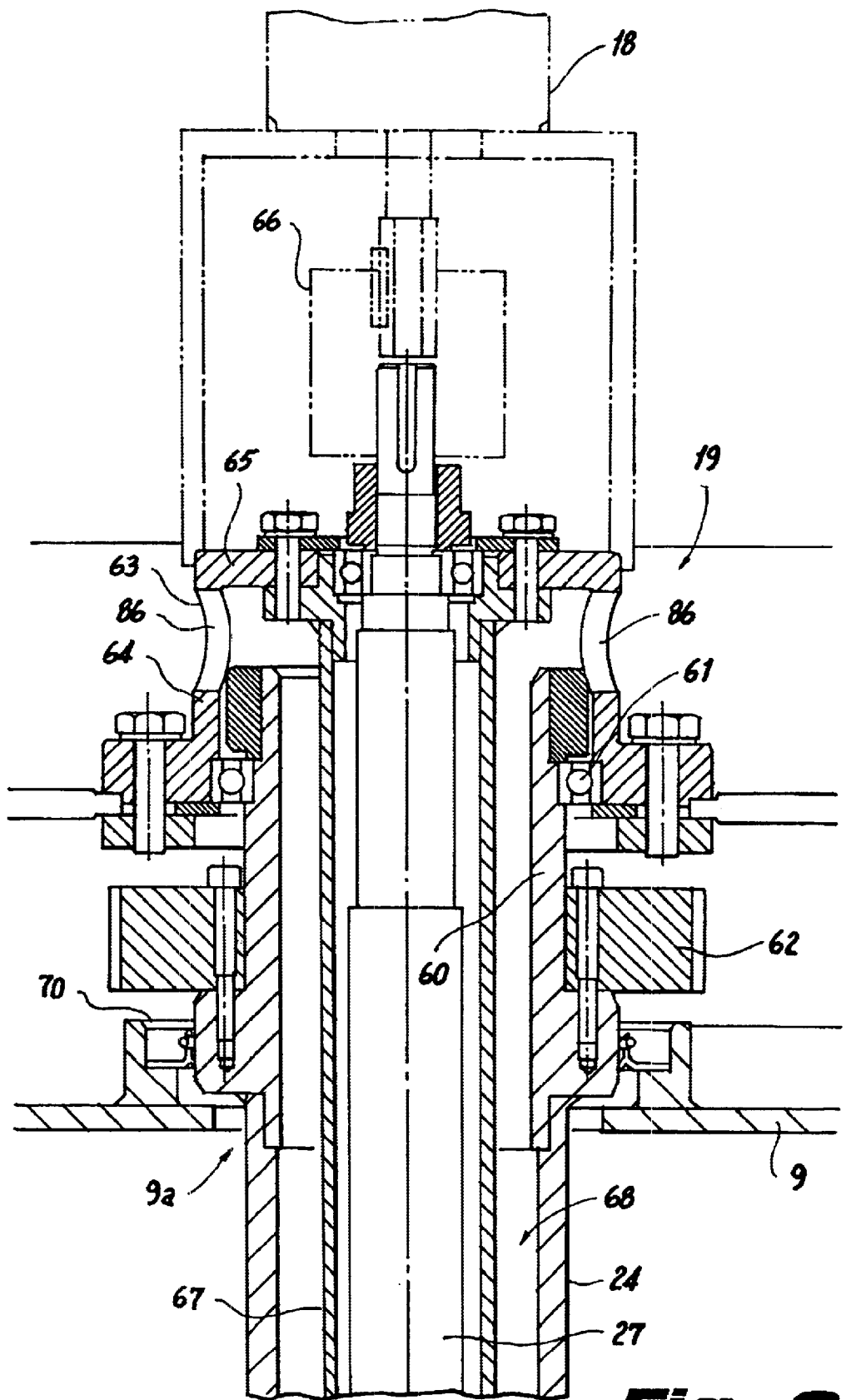
FIG. 3 is an enlarged sectional view of a further detail of FIG. 1.

With reference now to FIG. 3 of the drawings, this shows the upper end of the equipment 10 including the auxiliary casing 20, the support/transmission unit 19, the upper ends of the auger drive tube 24 and of the flail drive shaft 27 and their mounting on the cover 9.

The various parts of the assembly shown will not be described in detail as these and are not required for an understanding of the invention. In brief, the upper end of the auger drive tube 24 passes through an aperture 9a in the cover 9 and is fixed to a coaxial tubular mount 60 housed in the auxiliary casing 20. The upper end of the mount 60 is surrounded and supported by a fixed bearing housing 63, via a sealed bearing 61 between the bearing housing 63 and the mount 60, such that the mount 60 and the auger drive tube 24 are rotatable relative to the cover 9. The mount 60 receives rotary drive from the second motor 21 (FIG. 1) and associated drive belt 23 via a pulley 62 fixed to its outer circumferential surface. A semi-dual rotary shaft lip seal 70 forms a dust seal around the cover aperture 9a, sealing the hopper 13 from the space within the auxiliary casing 20. The bearing housing 63 further has a circumferential wall 64 and an annular top plate 65. The upper end of the flail drive shaft 27 is rotatably supported in the aperture in the top plate 65 and is connected to the motor 18 via a transmission assembly 66. The auger drive tube 24 and flail drive shaft 27 thus are rotatable independently of each other and receive drive independently from their respective motors 21, 18.

A final feature of the equipment which may be noted from FIG. 3 is the fact that the flail drive shaft is coaxially surrounded by a tube 67 housed coaxially within the auger drive tube 24. The tube 67 defines a passage 68 between its outer face and the auger drive tube 24 which communicates at its upper end through apertures 86 in the bearing housing 63 with the interior of the auxiliary casing 20 and, hence, with the air inlet 8 of the chamber 22. The lower end of the passage 68 opens into the mixing chamber 28 around the drive shaft 27 through apertures 69 indicated in FIG. 4. The tube 67 is fixed against rotation, the drive shaft 27 being rotatable within it.

Figure 4:
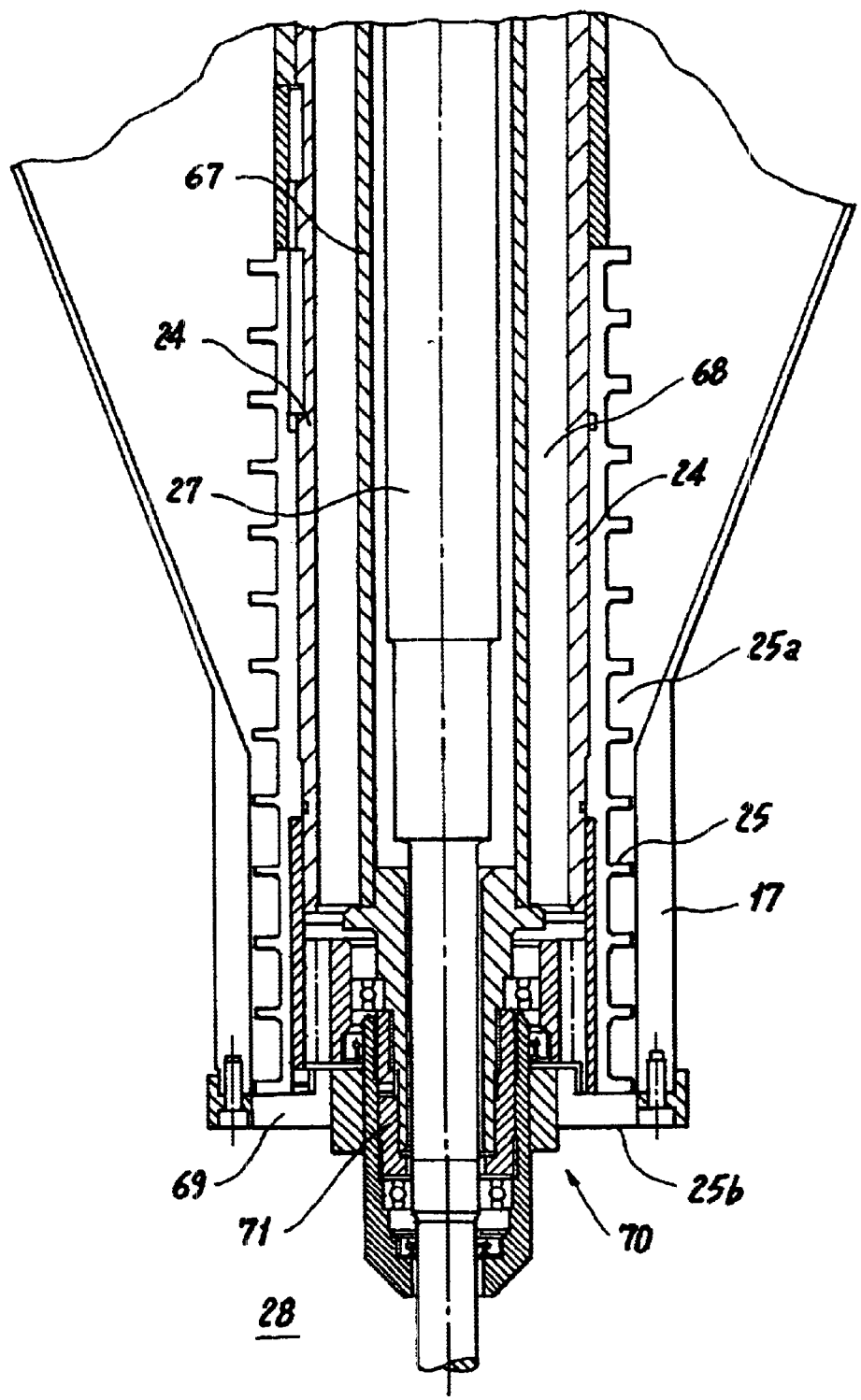
FIG. 4 is an enlarged sectional view of a further detail of FIG. 1.

With reference finally to FIG. 4, this shows the portion of the equipment including the bottom end of the auger 25 carried on its drive tube 24. Again only parts particularly relevant to the invention will be described.

FIG. 4 shows the bottom end of the auger housing 17 with the auger 25 housed in the feed duct 25a. The feed duct 25a is open at its lower end to define an annular outlet 25b into the mixing chamber 28.

The flail drive shaft is rotatably supported within the auger 25 and its housing 17 via a bearing assembly generally indicated 70 incorporating the apertures 69 which allow communication between the passage 68 and the mixing chamber 28.

In use of the equipment 10 described above, powder is supplied continuously to the hopper 13 through an inlet line (not shown) and is fed by the auger 25, driven by the motor 21, into the mixer chamber 28. Before the powder reaches the auger 25 it is stirred by the mixer arms 26 which prevent log-jams which would interrupt the powder flow as it falls into the mixer chamber 28; here it falls into the path of the flails 29, rotated by the motor 18, which break up any lumps of powder, which are in any case relatively soft, and distribute the powder as a fine smoke in the mixer chamber 28.

The distribution of the powder at this stage is further assisted by air flows drawn in through the annular passage 68 around the flail drive shaft 27 and the annular passage around the auger housing 17. The air flow is driven solely by the vortex in the lower, frusto-conical portion of the mixer chamber 28 and in the tail pipe 34.

It is found in practice, in use of the equipment 10 for reacting acid mine discharges with oxides, as will be described below, that a tail pipe 34 with a fifteen foot (approximately 4.6 m) drop produces a vortex strong enough to draw an adequate air supply through the equipment 10. It will be appreciated, however, that it may not be practical to provide a fifteen foot drop in some situations in which case the air flow may be induced by other means. For example an air compressor may be provided to supply air to the inlet 8 to the equipment or a pump may be provided in the liquid outlet pipe 34 to speed the liquid flow.

Simultaneously with the supply of powder, a liquid to be mixed therewith is supplied through the inlet duct 46, the liquid-inlet chamber 45 and the annular passage 44, being directed through the narrow gap 50 between the flow director knife-edge 49 and the chamber wall 31 and along the wall 31 to flow and spread down this wall 31 and onto the frusto-conical wall 33. In this process the powder, flung centrifugally from the flails 29, mixes and reacts with the liquid flow and is carried with it to the tail pipe 34.

More particularly, in order to achieve extremely effective mixing of the powder with the liquid, the powder is introduced in the finest grain size, as fine as talc, is broken into individual grains by the flails 29 and simultaneously whisked into a swirling smoke by the air flows, primarily through the inner passage 68 but also through the surrounding passage 42.

The mixing is further enhanced by the particular delivery of the liquid through the gap 50 onto the hemispherical wall 31 and the shaping of this wall; as the liquid flows down over this wall, the thickness of the flow decreases and its surface area expands so that an increasing surface area is exposed to the turbulent smoke. Moreover the high degree of drag between the thinning liquid flow and the chamber wall causes turbulence within the flow which in turn causes the surface layers to be renewed continuously so that further liquid is exposed to the powder and previous surface layers, containing powder, are absorbed into the body of the liquid where any reaction that may be occurring continues.

It will also be appreciated that the turbulence in the film is enhanced as the liquid/solid/air mixture coalesces to flow down the tail pipe 34 and passes through the radial diffuser 35 in the pipe 34. In practice it is found that the suction created below the diffuser fingers 35*a* extracts air from the flow and creates a return flow of liquid in an upward direction from about 300 mm to 450 mm below the diffuser. This has a very positive effect in mixing the air and liquid as it causes a myriad of minute bubbles to form which then reverse direction again to flow down the pipe 34, causing thorough agitation and continued mixing of the solid and liquid so that any reactions still occurring in the mixture can continue.

The equipment described above can thus achieve highly efficient mixing of any powdered solid and liquid but has further advantages with regard to the particular components for which it was developed. Specifically the equipment is particularly suitable for treating aqueous liquids which contain some components , such as ferrous salts, which are oxidizable by the oxygen in air. Here the thorough mixing achieved with air in the apparatus is clearly advantageous. The equipment has even greater advantages in the case of acid mine discharges which include components oxidizable by air and others oxidizable by oxides, particularly when the oxides are solid but highly hygroscopic and not all soluble so that it is impractical to carry out the reactions in solution.

The hygroscopic properties of the reagent require stringent precautions to be taken against moisture ingress in the delivery chain to the hopper 13 but even present problems once the powder has been fed to the plant hopper and metered by the auger to the point at which it is ready to be mixed with the acid discharge. Indeed any moist surfaces within the mixing chamber will turn to paste any reagent powder deposited on them. The volume of this paste will then increase as further powder is deposited on it until the spread of the paste accumulation extends to allow the moisture content to track to the powder source. This would prevent efficient distribution of the metered powder and at worst would create an exothermic reaction in the powder source, the metering auger.

To avoid such an occurrence it is essential that there are no moist surfaces within the mixing chamber that can retain the powder and, having done so, allow the moisture to track back to the powder source. This is achieved in two ways; the chamber wall 31, 33 is continuously swept with acid and splashing on to components that cannot be swept is minimised as will be explained below; any component within the mixing chamber that cannot be swept with acid is isolated from the powder source by a dynamic air gap of sufficient dimension to prevent bridging by paste formation.

First of all, to ensure all surfaces within the mixing chamber are continuously swept with acid, the acid flow is controlled by the variable-orifice flow deflector and valve unit 45a. This ensures that sufficient velocity is imparted to the acid flowing through the annular orifice is 50 to maintain a constant pressure of the flow over the chamber walls. The junction between the hemispherical wall 31, and the conical base section 33 (FIG. 1b) also imparts a sharp change in direction to the fluid flow such as to maintain the high pressure of contact and, in so doing, control the acid flow further to reduce any possibility of cascading or splash.

The acid flow is initially controlled by an external feed valve. When this valve is either opened or closed it will for a brief period reduce the acid flow to such a degree that all inertia is lost and, if no additional steps were taken, the acid would cascade into the mixing chamber and, in so doing, splash acid in all directions, including the powder source.

It is to prevent this occurrence that the orifice 50 through which the acid is introduced into the hemispherical part of the mixing chamber is fitted with the spring-loaded valve member 48. When there is no acid flow, the knife edge 49 of this valve member is sited approximately 1 mm clear of the surface of the mixing chamber so that even a gradual opening of the feed valve will provide an accelerated flow through the orifice 50 so that it reaches and adheres to the hemispherical wall 31 of the mixing chamber. As the flow increases, the build up of pressure in the header tank above the valve unit 45a will ease the valve member 48 to widen the orifice 50, against the controlling spring pressure. With a gap of 8 mm around the periphery of the valve member 48, it has on test passed 850 GPM which is just under $1.25^6$ GPD. The valve member 48 will open progressively with the flow pressure upon it until it reaches its maximum opening of 13 mm, but ensuring that at all times the velocity imparted to the acid flow maintains the required degree of control. Clearly the dimensions of the valve members, the gap, the spring calibration and the flow rates may be varied according to the particular intended usage of the equipment 10.

In use of the equipment described above for mixing/reacting solid and liquid components having consistent characteristics i.e. individual ingredients or mixtures with ingredients in uniform proportions, then the liquid supply and auger feed rates can be set at the beginning of a mixing process to meter the two components in appropriate relative proportions, whether stoichiometric or otherwise, to achieve a desired end result. In the case of acid mine discharges, however, the acidity and mineral contents of the liquid can be very variable and the rate of supply of the solid should preferably be varied to compensate. In particular, the pH of the discharge must be raised to a selected value of at least pH7: the pH values of the mine discharge entering the equipment 10 and of the product leaving it are therefore monitored and the speed of the auger varied in a PC fuzzy logic programme to ensure that the final pH remains within predetermined limits of the desired level.

With regard to acid mine discharges, these are often highly toxic and streams may have high flow rates and are sometimes in ecologically sensitive areas so that reliability of the treatment process is paramount. For this reason fail-safe systems are incorporated.

The main fail-safe system ensures the rapid shut-down of the equipment 10, starting with the closing of the external feed valve. This can be triggered by an inadequate treated effluent pH signal or an unacceptably high torque reading on the auger—indicating a potential breakdown in treatment.

The initial warning of low pH of the treated effluent would indicate that sufficient reagent had been applied: this could be due to a breakdown in reagent supply to the auger feed hopper. This would be checked by the PC which would respond if the low level transducer in the feed hopper was calling for more powder. If "yes", it would check that the mechanical powder conveyor was operating. If not, the system will shut down.

If the low level transducer was not calling for top up then it would indicate that there was sufficient powder available but this was not being passed by the auger.

The PC would check that the encoder recording auger speed was indicating that the auger was turning. If not, the system would shut down.

If the auger were turning but not delivering adequately, it would indicate a log jam in the powder hopper, preventing the auger from picking up powder: in this instance an electric vibrator, not shown, fitted to the hopper would be operated for a brief period to free the jam. If no improvement was registered in the pH, the equipment would be shut down.

In a multiple module installation, each module being constituted by the equipment 10, when the PC is determining the cause of a malfunction or shutting down one module, remaining modules could open up to ensure that the overall level of treatment would be maintained.

Another aspect of design to enhance the reliability is the complete absence in the mixing chamber of any form of mechanical agitator in contact with both acid and reagent, which would become encrusted with accumulations of reagent paste. This would become a source of acid splash creating the danger of acid reaching the reagent auger and potential failure.

The degree of automation in the control and operation of the plant not only enhances reliability but greatly reduces the labour costs of operating. The low labour requirement is also due to the simplicity of the system and the fact that large capacity installations may consist of multiple standard modules. A single standard allows adequate holding of spares without the penalty of high inventory value.

The air requirements for motor cooling, reagent distribution and the partial oxidising function, specifically converting the ferrous iron content in acid mine discharges to ferric iron, is provided by atmospheric air feeding the vortex in the plant. This conversion to ferric iron by the oxygen in the atmospheric air reduces the amount of solid oxide reagent required for treatment. The vortex induced airflow not only eliminates the requirement for an energy-consuming air compressor but also saves the capital and operating costs of such equipment.

The elimination of an air compressor avoids the production of condensate when air is employed to distribute the reagent. The fitting of an air drier to such a compressor only replaces the moisture produced with static electricity which adversely affects the powder distribution.

The equipment is very energy efficient for a given through-put with the peak load of less than 3 kW and total energy consumption estimated to be less than 13 kWh per 24 hours of operation. The majority of the load is associated with the aeromechanical conveyor used to lift the solid reagent into the hopper. In a commercial installation this lift would feed up to six modules.

To treat the same effluent flow in a batch treatment process would typically employ several process tanks and costly containment areas for toxic sludge, occupying a considerable area.

The low energy requirement not only reduces the cost of the treatment but makes its application practical in many sites that require treatment where electrical mains capacity is either limited or non-existent.

Each plant module is in itself very flexible in operation as it can receive for treatment a very wide range of effluent flow rates and an infinite variety of chemical characterizations. As all modules are identical any number can be installed to cater for very large or seasonally varied flow rates.

In a multi-modular installation one module would normally be selected to modulate with the remaining modules operating at a fixed delivery rate, this would prevent the tendency for the controls to hunt in operation.

Should an individual module require shutting down for routine maintenance or repair the flow to the remaining modules would be increased accordingly so that the overall treatment remains unaltered.

Any one of the group of modules could be selected to operate in modulating mode.

In a particular embodiment of the invention, mine water containing arsenic, barium, cadmium, copper, manganese, iron, nickel, lead and zinc compounds was treated in the equipment 10 with an oxide mixture available commercially and containing, calcium oxide, magnesium oxide and silica, (typically 50 ppm CaO, 150 ppm MgO, 800 ppm $SiO_2$+ components containing $SiO_2$).

Treatment nt resulted in the reduction of metal concentrations in the supernatant liquor by from 90–100%. Water quality appeared to improve if the water remained in prolonged contact with the sludge generated by the oxide application after leaving the equipment 10. Sludge obtained from the treated water consisted of fine-grained reddish-brown granules containing 10% white tubular calcite and gypsum crystals. Besides calcite and gypsum, most of the sample consisted mainly of amorphous material (presumably complex silicates and oxides of potassium, manganese, calcium, and iron) according to X-Ray diffraction. Chemically, the sludge consisted mainly of iron and calcium, with minor amounts of zinc, sulphur, silicon, aluminium, chlorine, magnesium, manganese, and potassium. Most of the transition metals were immobilised in the solid sludge, resulting in greatly improved water quality.

More especially, the sludge obtained was subjected to a standard EPA toxic chemical leach procedure to check its suitability for dumping. Specifically the pH of the sludge was measured at 7.5 indicating that TCLP extraction solution No. 2 must be used. Due to the lack of volatile compounds evident in this examination a zero head space TCLP procedure was not employed. The following standard laboratory method was employed:
1. 5.0 grams of moist sludge material was placed in a 125 ml polypropylene bottle.
2. 100.0 ml of TCLP extraction fluid #2 was added to the bottle.
3. The bottle was placed on a Burrel Wrist Action Shaker and continuously shaken for 18 hours.
4. The sample was filtered to 0.45 $\mu$m and subjected to ICP-AES analysis following standard EPA protocol for ICP-AES analysis.

TCLP concentrations from the sludge passed U.S.EPA standards for toxic metal leaching. None of the target metals (Ag, As, Ba, Cd, Cr, Hg, Pb. Se) were leached in excess of U.S EPA action levels for TCLP leaching. In addition, all the solid material which appeared to dissolve during shaking was extracted by the 0.45 $\mu$m acetate filter indicating that the toxic metal bearing particles within the sludge separated as suspended sediment but did not dissolve during the leach procedure. This indicated that the sludge does not require further treatment and would not be subject to storage restrictions for disposal in the USA. Moreover, the decant water above this sludge was sufficiently clear to satisfy U.S federal drinking water criteria.

Operating conditions for the test were as follows: Acid mine discharge water (AMD) was fed to the equipment 10 via a 200 mm pipe from an underground pump. The flow rate was monitored by a 200 mm magnetic flowmeter situated downstream from a manually operated gate valve which was used to set the flow through the dosing plant. The solid oxide reagent (KB-1) was fed to the hopper 13 automatically by an aero-mechanical conveyor. The KB-1 was fed from the hopper by a variable speed auger 25 to maintain precise delivery rates of reagent powder into the mixing chamber 28.

From the flowmeter, the 200 mm pipe fed the AMD to the header tank of the plant, situated at the top of a 4.5 m (15 ft) high scaffold tower. The AMD was then accelerated by the variable control valve unit 45a which directed the flow radially from the centre of the hemispherical mixing chamber so that it adhered to the concave walls.

The treated water leaves the tapered base of the mixing chamber via a 200 mm diameter vertical tail pipe 34 leading to a maze consisting of an open launder which, by turning the flow of treated AMD twice through 180°, provided an excellent opportunity to observe the nature of the floc and sediment formation in a very compact area.

The maze was dimensioned (9.54 m$^3$) to allow a residence time of just under 4.25 minutes at 38 Ls$^{-1}$ to enable the treated AMD time to reach final pH at the exit weir, where pH probes (pH2 or pH3) were positioned. An intermediate probe was positioned at the mid point of the first leg.

In a first trial the plant was operated with a continuous AMD flow of 38LS$^{-1}$ and a wide range of oxide delivery rates to determine, by analysis of the water samples, which range of delivery rates was the most economic whilst still satisfying the criteria of reducing the Cadmium level to <0.001 ppm, the plan being to refine this range to a specific rate in subsequent trials.

Trial 1

The first trial was started with a delivery rate of 2.1 gL$^{-1}$. The final pH monitored at the outlet weir of the maze open launder was 12.5.

As this was excessive, the delivery was quickly reduced in steps until a delivery rate of 2.92 Kgmin$^{-1}$ at an auger speed of 40 rpm was reached resulting in a final pH of 8.5.

As this was approaching the target are of 7.5 to 8.5 pH, it was decided to reduce the delivery rate once more to 1.90 kgmin$^{-1}$ (26 rpm) reducing the pH to 7.3 just below the target area. From this point the intention was to operate at progressively higher pH for periods long enough to allow the pH to stabilise, take a sample for water analysis, change the delivery rate by a small increment and then repeat the process.

In this manner it was planned to cover a range of pH settings within the focused area, then by reviewing the water analysis refine the process in subsequent trials with the object of running for more protracted periods at each setting ensuring stable conditions and time to take sufficient samples.

It was found that the first two samples taken at the depressed pH levels reduced Cadmium from 0.049 ppm, to 0.015 ppm and 0.012 ppm respectively. The remaining six samples all reached EQS for Cadmium at 0.001 ppm or lower.

Such results for the first operation of the pilot plant at 38 LS$^{-1}$ (500 GPM) were very encouraging, all the more so when it was found that a sheared coupling had adversely affected the reagent mixing efficiency.

Trial 2

Following the result of the trial K1 it was decided to aim at an even lower final pH by reducing the reagent delivery rate. Whilst it was appreciated that half the trials may not reduce the Cadmium to 0.001 ppm it would narrow the target area for determining the most economic delivery rate. The effect is shown in Table 1 below but are, to some extent, anomalous because of erratic pH readings.

TABLE 1

| Sample | Final pH at weir | Lab analysis pH | Cadmium/ppm |
| --- | --- | --- | --- |
| K2-1 | 7.7 | 6.7 | 0.001 |
| K2-2 | 7.9 | 6.9 | 0.001 |
| K2-3 | 7.9 | 7.3 | 0.001 |
| K2-4 | 6.9 | 6.6 | 0.007 |
| K2-5 | 7.6 | 6.8 | 0.006 |
| K2-6 | 7.8 | 6.9 | 0.003 |

K2-1 was the lowest pH to have reduced the Cadmium to 0.001 ppm.

Trial 3

The plant was run at two selected value of pH namely 8 and 9. Test K6-1 at 9 pH reduced Cadmium to <0.001 ppm and still registered 8.9 pH at the time of analysis. Test K6-2 run at 8 pH reduced Cadmium to 0.003 ppm and registered 7.0 pH at the time of analysis, as shown in Table 2.

TABLE 2

| Sample | Mean of pH2 & 3 | pH at lab Analysis | Cadmium/ppm |
| --- | --- | --- | --- |
| K6-1 | 9.1 | 8.9 | <0.001 |
| K6-2 | 8.0 | 7.0 | 0.003 |

Trial 4

The plant was run on five trials at 8.1 to 8.5 pH in 0.1 pH steps. As can be seen from Table 3, K8-2 and K8-4 both reduced the Cadmium level from 0.052 ppm to >0.001 ppm.

TABLE 3

| Sample | Mean of pH2 & 3 | pH at lab Analysis | Cadmium/ppm |
| --- | --- | --- | --- |
| K8-1 | 7.9 | 6.7 | 0.006 |
| K8-2 | 8.3 | 7.6 | <0.001 |
| K8-3 | 8.4 | 6.9 | 0.003 |
| K8-4 | 8.5 | 8.5 | 0.001 |

Trial 5

K11 was performed at a variety of delivery rates resulting in a progressive reduction in the final pH values at the weir which reflected the progressive reduction in reagent delivery rate.

Results are shown in Table 4

TABLE 4

| Sample | Mean of pH2 & 3 | pH at lab analysis | Cadmium/ppm |
| --- | --- | --- | --- |
| K11 |  | 8.8 | <0.001 |
| K11-1 | 8.25 | 10.8 | <0.001 |
| K11-2 | 8.4 | 9.0 | <0.001 |
| K11-3 | 8.1 | 8.6 | <0.001 |
| K11-4 | 8.4 | 8.5 | <0.001 |
| K11-5 | 8.0 | 8.3 | <0.001 |
| Environment Agency | 8.5 | Not available | Not available |

As can been seen from Table 4, all six sample reduced Cadmium to <0.001 ppm from 0.064 ppm. It is worthy of note that sample K11-5 was taken from a delivery rate of 0.8 gl$^{-1}$ or 1.8 Kg/min at 38 Ls$^{-1}$ (500 GPM). This was the lowest delivery rate of reagent to reduce the Cadmium to <0.001 ppm in this series of trials and was only 38% of the amount of KB-1 required to reach the same criteria in prior CSMA laboratory tests, results of which are given in table 5.

TABLE 5

| KB-gL$^{-1}$ | Solution pH | Cadmium | Iron | Manganese | Zinc |
| --- | --- | --- | --- | --- | --- |
| 2.1 | 9.19 (AMD 3.04) | <0.001 | Insufficient sample | 0.09 | 0.099 |
| 0.8 | 8.3 (AMD 3.1) | <0.001 | 0.3 | 1.4 | <0.01 |

Figure 5:
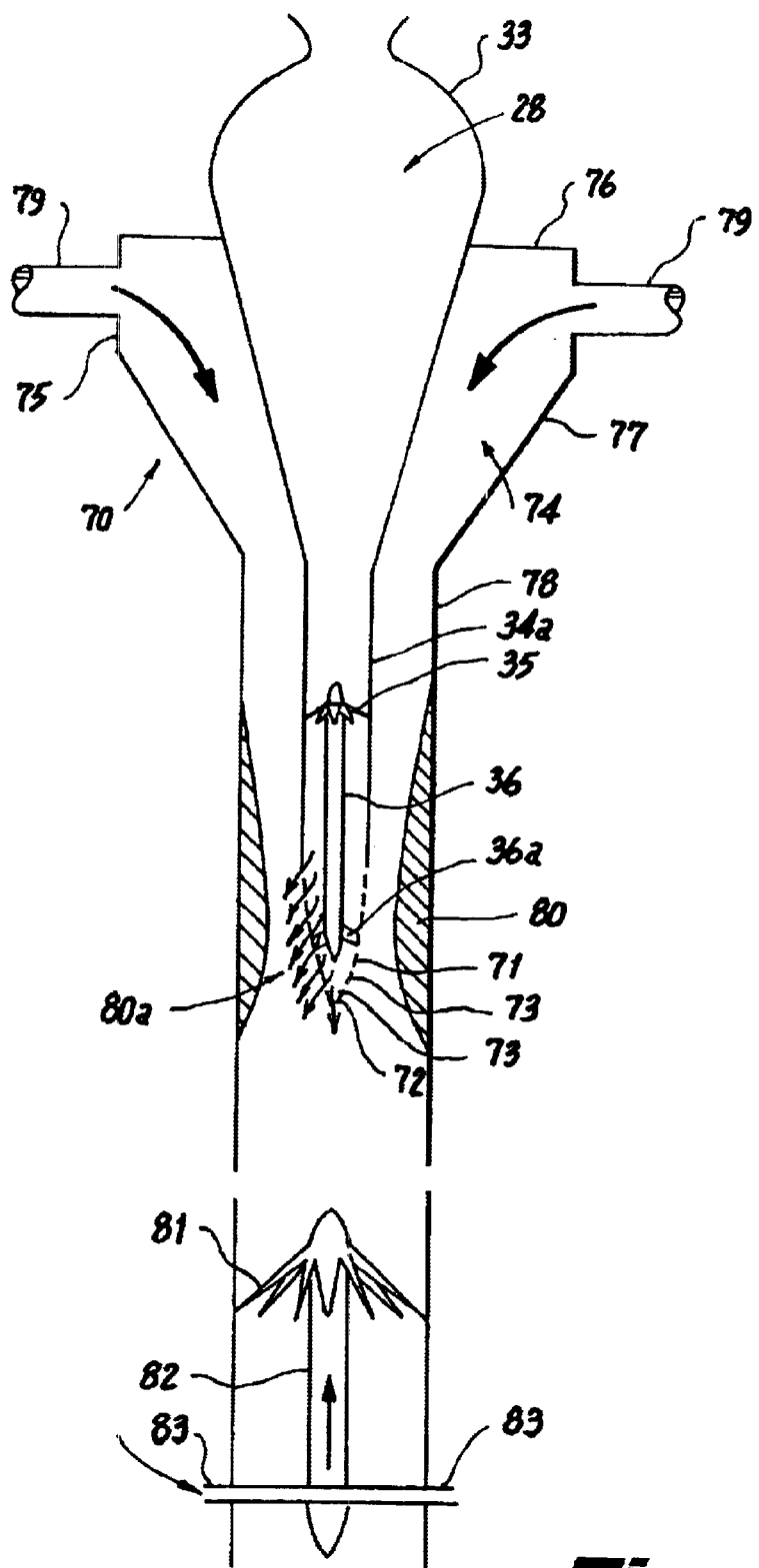
FIG. 5 is a schematic axial sectional view of a variant of the equipment of FIG. 1 fitted with auxiliary liquid-supply equipment.

With reference now to FIG. 5 of the drawings, a variant of the equipment 10 is shown, identical parts being indicated by the same reference numerals. The equipment of FIG. 5 is in fact identical to that of FIGS. 1 to 4 apart from a modification to the tail pipe 34 and the provision of auxiliary liquid-supply equipment, generally indicated 70, around the frusto-conical casing 33 of the mixer chamber 28 and the tail pipe, here indicated 34a.

The tail pipe 34a in this embodiment is shortened and its lower end portion 71 tapers to an axial outlet 72. The tapered end portion 71 is also perforated to provide a plurality of small outlet orifices 73. The diffuser shaft 36 is supported within the tail pipe 34a by means of several struts 36a extending between its lower end and the tail pipe end portion 71.

The auxiliary equipment 70 includes an inlet chamber 74 coaxially surrounding the casing 33 and having an upper cylindrical wall 75, an annular top closure wall 76 sealed to the casing 33 and a lower funnel wall 77 tapering from the lower edge of the wall 75 to an outlet duct 78 coaxially surrounding the tail pipe 34a. Inlet pipes 79 open into the upper part of the chamber 74 at circumferentially spaced positions; two such inlet pipes 79 are shown opening radially into the chamber 74 but there may be several inlet pipes and their inclination to the chamber axis may be varied. Currently, five inlet pipes 79 are envisaged, each having a diameter of 200 mm and each equipped with appropriate valving to enable the liquid supplied to the chamber 74 therethrough to be regulated.

The outlet duct 78 is fitted internally with a Venturi member 80 which defines a Venturi duct 80a the narrowest portion of which coaxially surrounds the perforated end portion 71 of the tail pipe 34a. The size and shaping of the Venturi member 80 may be varied according to the desired fluid flows through the equipment in use. Currently the Venturi member is of fiber-glass reinforced resin while the remaining parts of the equipment are of stainless steel but other materials may be used according to the materials to be mixed.

A final feature of the auxiliary equipment 70 is an additional radial diffuser 81 supported coaxially within the outlet duct 78 downstream of the Venturi member 80 by means of a hollow shaft 82. The diffuser 81 is similar to the diffuser 35 but of a larger size to match the larger diameter of the outlet duct 78. Supplementary air supply ducts 83 extend through the wall of the duct 78 to open into the interior of the hollow shaft 82.

In use of the equipment 10 with the auxiliary equipment 70, liquid and powdered solid are mixed together in the equipment 10 in exactly the same way as described above and the auxiliary equipment 70 is used to mix a further quantity of liquid with the mixture formed in the equipment 10.

Additional liquid supplied through the inlet pipes 79 to the chamber 74 flows down through the Venturi duct 80a, thereby drawing the mixture in the tail pipe 34a through the perforations 73 to be mixed with the additional liquid. The flow through the Venturi duct also causes the required pressure reduction in the tail pipe 34a which, in the embodiment of FIGS. 1 to 4, is caused by the length of the tail pipe 34 itself.

The combined flow from the tail pipe 34a and the outlet duct 78 then reaches the additional radial diffuser 81 which ensures the thorough mixing of the two flows. The mixing and any chemical reaction in the flow requiring the presence of oxygen are enhanced by air drawn into the centre of the diffuser through the supplementary air supply ducts 83 by the depression in the duct 78. The air supply through the ducts 83 is regulated to ensure that it does not increase the pressure in the mixing chamber 28 of the equipment 10 to a level above which the mixing efficiency is reduced: regulation is via a pressure-monitoring device in the mixing chamber and diaphragm valve controlling the air supply.

In use of the equipment 10 and auxiliary equipment 70 for treating acid mine discharges, the provision of the auxiliary equipment 70 enables a far larger quantity of mine water to be treated per hour for a given size of equipment 10 than is feasible with the equipment 10 alone, without loss of efficiency. Specifically, equipment 10 capable of treating $10^6$ GPD ($45^6$ liters per day) can treat up to $60^6$ GPD when fitted with the auxiliary equipment 70, substantially equal efficiency being achieved throughout the range with the use of different Venturi members 80 for the different flow rates.

In order to neutralise the additional mine discharge flow introduced through the auxiliary equipment 70, a larger proportion of oxide reagent must be supplied to the mixing chamber 28 of the equipment 10 than required to treat the mine discharge flow to the mixing chamber itself. The mixture leaving the mixing chamber 28 through the tail pipe 34a is thus rich in oxides, the content being calculated to accord with the excess required to treat the auxiliary flow through the duct 78. Thorough mixing of the two flows is achieved by means of the Venturi 80 and diffuser 81 such that the reaction of the oxides with the mine discharge can go to completion. The equipment 10, 70 can thus treat extremely large quantities of liquid without the cost of additional moving parts or the increased power consumption required if the equivalent number of modules of the equipment 10 were used.

In view of the extremely large throughput achievable, it is envisaged that it will be economical to use the enhanced equipment 10, 70 to raise the pH of a mine discharge in several stages to enable the selected precipitation and recovery of different components of the waste. This would, for example, enable various valuable metals, such as zinc, to be recovered from the waste, with the potential for reducing the overall costs of treating wastes to meet standards for discharge into the environment.

What is claimed is:

1. Apparatus for mixing powder with a liquid, comprising:
   a mixing chamber having an upper interior surface, said upper interior surface progressively increasing in cross-section from top to bottom;
   liquid inlet means in an upper part of the chamber for directing the liquid on to an upper part of the upper interior surface in the chamber so that the liquid flows as a film downwardly over and in adherence with the upper interior surface while simultaneously undergoing an increase in area; and
   means for introducing the powder to the chamber at a position spaced from the liquid inlet flow, for dispersing the powder within the chamber and for directing the powder toward said upper interior surface so that it impinges on the liquid flowing down said upper interior surface and mixes therewith as the area of the film increases.

2. Apparatus according to claim 1, wherein the mixing chamber comprises a domed upper section, and said upper interior surface comprises an internally domed surface of said domed upper section, said chamber having a nozzle positioned within said domed section for feeding said liquid onto the internally domed surface in an upper region thereof so that said liquid forms a film of liquid flowing downwardly over said internally domed surface with a concomitant increase in area.

3. Apparatus according to claim 2, wherein the nozzle is at least one of an annular nozzle, and an annular array of individual nozzles, positioned about a central axis of the said domed section and operable to feed said liquid onto said domed surface over a complete arc of 360 degrees.

4. Apparatus according to claim 3, wherein the nozzle positioning is such as to direct said liquid substantially tangentially onto an upper region of said domed surface.

5. Apparatus according to claim 3, wherein the nozzle comprises an automatic aperture control which automatically adjusts nozzle aperture size between maximum and minimum values depending on a volume of liquid flowing through said aperture, the larger the volume the larger the aperture.

6. Apparatus according to claim 2, wherein the said mixing chamber comprises a frustoconical lower section axially aligned with and extending downwardly from the said domed section and down the internal wall of which the liquid/powder mixture flows, upon leaving the said domed section, and an exit conduit for the liquid/powder mixture positioned at a bottom of the frustoconical section.

7. Apparatus according to claim 6, wherein the exit conduit is a vertical conduit aligned on a common central axis of the frustoconical and domed sections of the mixing chamber.

8. Apparatus according to claim 7, which comprises a radial diffuser positioned within the said exit conduit.

9. Apparatus according to claim 6, wherein the exit conduit opens into a further mixing chamber comprising means for introducing a further quantity of liquid for mixing with the liquid/powder mixture in said chamber, and another exit conduit for recovering the liquid/powder mixture mixed with said further quantity of liquid from the further mixing chamber.

10. Apparatus according to claim 9, wherein the further mixing chamber comprises an upper frustoconical section positioned above the lower, frustoconical section of the first mixing chamber, an upper section of said further mixing chamber comprising said means for introducing a further quantity of liquid, and a lower straight section encompassing the exit conduit from the first mixing chamber, said lower straight section incorporating a venturi adjacent a lower end of said exit conduit from the first mixing chamber to accelerate said further liquid as it flows past said lower end of the exit conduit chamber.

11. Apparatus according to claim 10, comprising a further radial diffuser located within the lower straight section of the further mixing chamber downstream of the venturi and said lower end of the first-mentioned exit conduit.

12. Apparatus according to claim 1, wherein the means for dispersing and introducing the dispersed powder into the mixing chamber comprises a feed conduit for the powder extending downwardly into and terminating within a domed section of the mixing chamber along the central axis thereof, and a powdered distribution means at the terminal end of the feed conduit, said powdered distribution means being operable to direct the powder particles issuing from an end of the feed conduit towards said internally domed surface by means of a centrifugal force.

13. Apparatus according to claim 12, comprising means for introducing an airstream into the mixing chamber along with said liquid and powder components.

14. Apparatus according to claim 13, wherein the airstream introducing means operate to introduce said airstream as an annular stream of air surrounding the terminal end of the powder feed conduit for the said powder.

* * * * *